Inventors:
Jacob W. McNairy,
Frank A. Rosenkrans,
Arthur E. Coombs,
by Harry E. Dunham
Their Attorney.

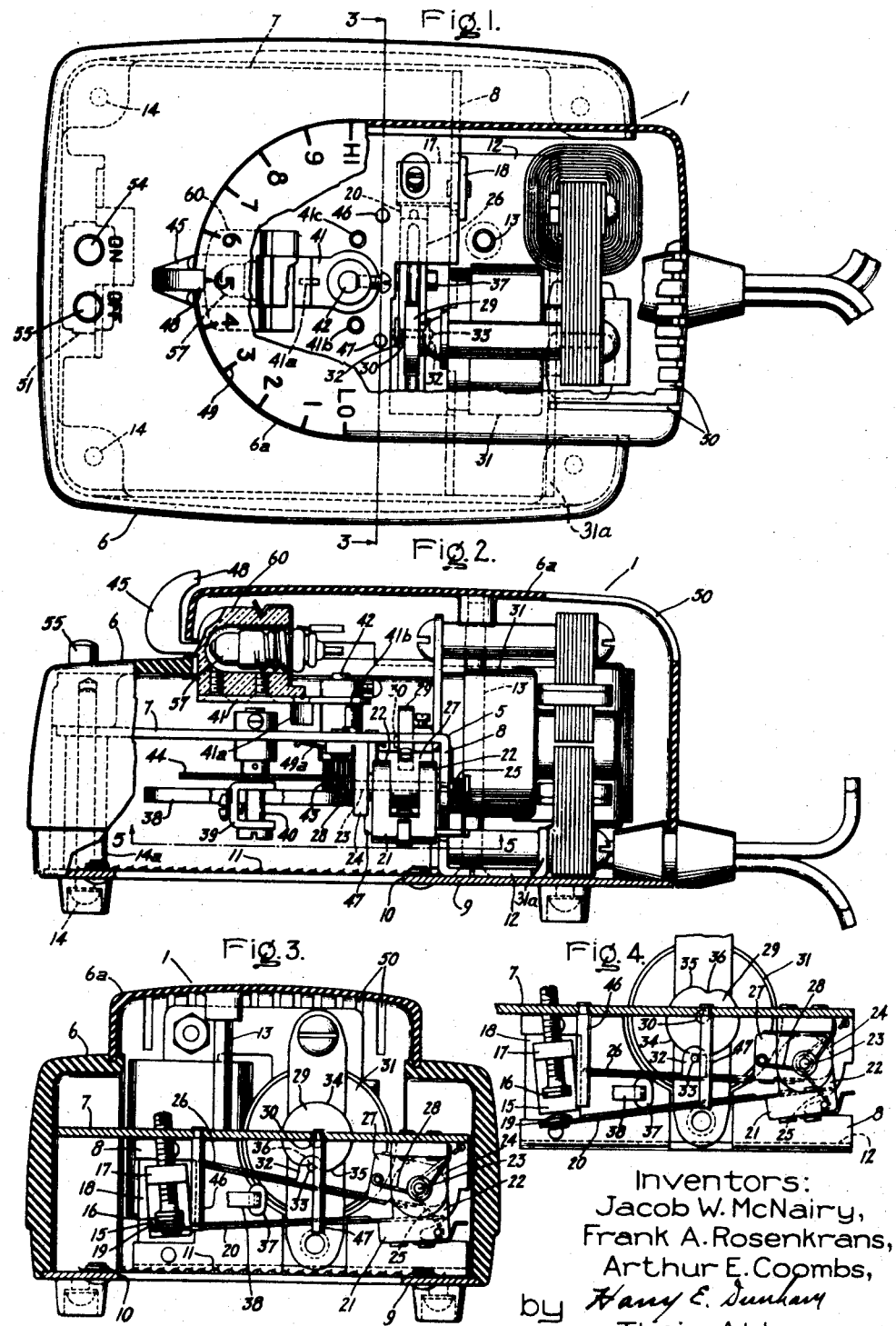

UNITED STATES PATENT OFFICE 2,429,475

CONTROL DEVICE FOR HEATER CIRCUITS

Jacob W. McNairy, Frank A. Rosenkrans, and Arthur E. Coombs, Bridgeport, Conn., assignors to General Electric Company, a corporation of New York Application April 12, 1945, Serial No. 588,014

7 Claims. (Cl. 200—139)

This invention relates to control devices, more particularly to a control device for controlling the operation of a heating circuit so that the heat output of the circuit may be readily varied in small increments from a predetermined minimum to a predetermined maximum.

More particularly, this invention relates to a control device for an electric circuit so that the length of time the circuit is energized in a predetermined cyclical period may be varied from energization for minimum time, corresponding to low heat position, to energization for 100% of the time, corresponding to the maximum output of the particular circuit.

And while it is not limited thereto, this invention is especially useful in the control of electric blankets and like heated devices where it is desired to correct the energization of the device in accordance with ambient temperature variations so that a substantially constant temperature is maintained irrespective of these variations.

In accordance with this invention, a circuit control device, such as a switch, is provided for connection into the heating circuit. This switch is provided with an oscillatory operating arm which in turn is operated by means of a second oscillatory arm, which I shall call the actuating arm, and which is oscillated continuously during the operation of the device.

The two arms are angularly positioned with reference to each other, and interposed between them is a wedge which transmits motion from the actuating arm to the switch arm, the resulting motion of the switch arm depending upon the position of the wedge longitudinally of the arms. This position of the wedge is controlled by a manually operable device so as to control the movement of the switch arm. Furthermore, suitable temperature responsive means are provided for controlling the position of the wedge in accordance with the ambient temperature so that the motions imparted to the switch arm depend not only on the manually operable means but also on the ambient temperature.

The switch arm is so related to the switch that variations in its motion vary the percentage of time that the switch energizes the circuit to the time that the circuit is deenergized, thereby varying the energy input to the controlled device.

Figure 5:
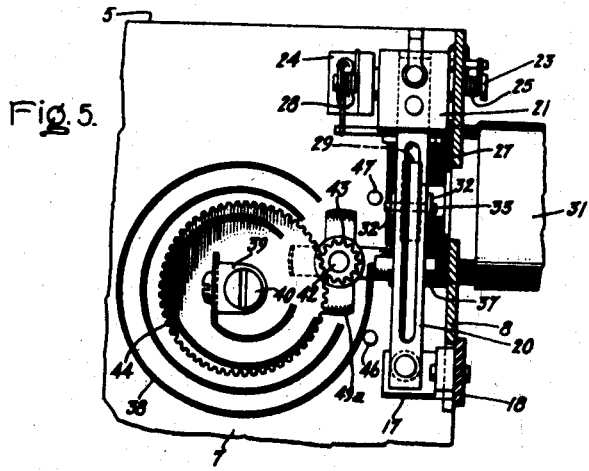

For a more complete understanding of this invention, reference should be had to the accompanying drawings in which Fig. 1 is a plan view of a control device embodying this invention, parts being broken away so as to illustrate certain details of construction; Fig. 2 is a vertical elevation, mainly in section, of the control device shown in Fig. 1; Fig. 3 is a sectional view taken through the line 3—3 of Fig. 1 and looking in the direction of the arrows; Fig. 4 is a fragmentary view similar to Fig. 3, but illustrating certain elements of the control device in different operative positions; Fig. 5 is a fragmentary bottom plan view looking from the line 5—5 of Fig. 2 in the direction of the arrows; and Fig. 6 is a diagrammatic view illustrating the control device of Figs. 1–5 as applied to the control of an electrically heated blanket.

Referring to the drawings, this invention has been shown as applied to a control device 1 for controlling the heating circuit of an electrically heated blanket 2. The blanket 2 is heated by a resistance conductor 3 which is formed into a series of convolutions spread through the greater portion of the area of the blanket, as clearly shown. It will be understood that the conductor 3 may be applied to the blanket in any suitable way; preferably, however, the blanket will be provided with channels through which the conductor is threaded, the channels either being woven in the blanket or formed therein by stitching.

Figure 6:
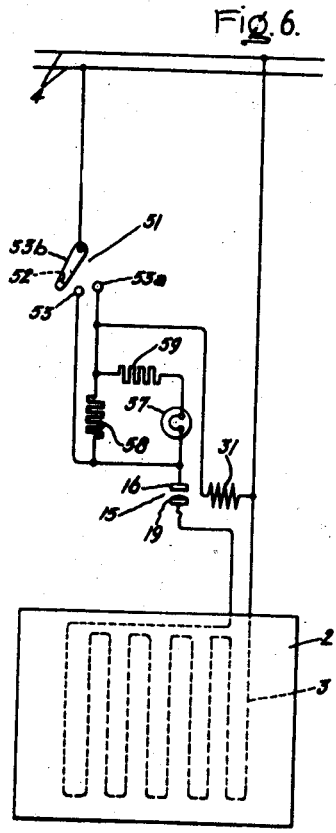

As shown in Fig. 6, the control device 1 is interposed between the blanket 2 and a suitable two conductor electrical supply source 4.

The control device 1 comprises an L-shaped supporting base plate 5 mounted within a suitable casing 6; as shown, the long leg 7 of the plate 5 is positioned horizontally in the casing 6 while the short leg 8 of the base is positioned vertically therein. The casing, as shown, is of boxlike form, and while the walls thereof may be formed of any suitable material, preferably and as shown the sides, end and top wall will be formed of a suitable electrically insulating material such as a molded plastic. The bottom of the casing is closed by a metal wall 9 which has an enlarged opening 10 formed therein covered by a screen 11. The vertical wall 8 of the plate 5 at its bottom is provided with an outwardly extending flange 12 to which is rigidly secured an L-shaped cover member 6a by means of elongated screw fastening means 13. The left-hand end of the long arm 7, as viewed in Fig. 2, is secured to the casing 6 through screw fastening means 14 and intermediate spacer members 14a.

The control device comprises a switch 15 having a fixed contact 16 formed on the end of a screw, as shown, and which is threaded in a conducting support 17, which in turn is supported from the upright leg 8 of the base 5 by means of a non-conducting sheet 18. The switch further comprises a contact 19 mounted upon one end of a switch actuating arm 20. The other end of this switch arm 20 is mounted upon an electrically insulating support 21. This support is provided with a pair of upright arms 22 shown more clearly in Fig. 2 and which are pivotally mounted on a shaft 23 having its right-hand end, as viewed in Fig. 2, journaled in the upright section 8 of the base plate, and its left-hand end journaled in the bearing plate 24 depending from the bottom of the transverse section 7 of the base plate. The switch arm 20 is baised clockwise, as viewed in Fig. 3, by means of a spring 25, that is, in a direction normally to hold the contact 19 against the fixed contact 16.

As shown diagrammatically in Fig. 6, the contacts 16 and 19 are connected in one of the conductors connecting the blanket 2 to the supply 4, and it is contemplated that during the operation of the device the blanket will be energized when these contacts are closed and will be deenergized when they are opened.

Suitable means are provided for oscillating the switch arm 20 to energize and deenergize the blanket, this means comprising an actuating arm 26 positioned above the switch arm 20 in spaced relation with it and substantially coextensive with it, as more clearly shown in Figs. 3 and 4. Also the arm 26 is positioned at an angle to the arm 20, as clearly shown in these figures. The right-hand end of the arm 26 as viewed in Figs. 3 and 4 also is pivotally mounted upon the shaft 23, this end of the arm being mounted upon an electrically insulating supporting block 27 which in turn is journaled upon the shaft 23. This arm is biased upwardly away from the switch arm 20 by means of a spring 28.

The position of the arm 26 away from the arm 20 is determined by means of a cam 29 which also functions to periodically oscillate the arm 26. The cam 29 is mounted to rotate with a shaft 30 which is continuously driven by means of a suitable constant speed electric motor 31 of any suitable construction. The cam 29 is driven by the motor so as to operate any suitable number of R. P. M. In the specific embodiment of the invention illustrated it is rotated 1.0 R. P. M. The timing motor which drives the shaft 30 is mounted upon a vertical wall 31a of the base flange 12. Preferably, the arm 26 will be provided with upright arms 32 which support a pin 33 transversely across the arm and which pin engages the periphery of the actuating cam 29.

The driving cam 29 is provided with a rise section 34 and with a low section 35 so that each revolution of the cam the arm 26 is oscillated so as to move toward the switch arm 20 and then away from it. Furthermore, the cam is provided with a depression 36 for a purpose to be described presently.

The oscillatory motion of the pivoted arm 26 is transmitted to the arm 20 to oscillate it by means of a wedge 37 which is interposed between the two arms, as shown. It will be understood that when the arm 26 is oscillated during the portion of its motion toward the switch arm 20, it will move the wedge 37 against the arm 20 and operate it, the motion imparted to the arm 20 depending upon the position of the wedge 37 lengthwise of the arms.

The wedge 37 is carried upon the free outer end of a spiral member 38, as more clearly shown in Fig. 5. The inner end of this spiral member is mounted upon a bracket 39 which is fixed to a shaft 40 which is journaled in the transverse section 7 of the base 5. The position of the support 39 is controlled by means of an arm 41 (Figs. 1 and 2) mounted upon a shaft 42 which shaft is geared to the shaft 40 through spur gears 43 and 44. A portion 45 of the lever 41 projects exteriorly of the casing whereby it is accessible for adjustment. It will be understood, therefore, that when the knob 45 is adjusted it will rotate the spiral 38 and hence will shift its outer free end to adjust the position of the wedge 37 longitudinally of the two arms 20 and 26.

It will be clear in view of the foregoing that when the motor 31 drives the cam 29, the cam will oscillate the arm 26 and that the motion of the arm 26 will be imparted to the switch arm 20, the motion of the arm 20 of course depending upon the position of the wedge 37 which in turn depends upon the setting of the knob 45. If the knob 45 be adjusted so that the wedge is at the extreme left-hand limit of its longitudinal motion, which position is determined by a pinlike stop 46 that is positioned to engage the wedge, then the motion of the oscillatory arm 26 will be imparted to the switch arm 20 after relatively long intervals during which the switch contact 19 is in engagement with the contact 16. Under such circumstances the blanket will be energized for "high" heat. On the other hand, if the wedge be at its extreme right-hand position of adjustment, which is determined by means of a pinlike stop 47 positioned to engage the wedge and stop it, the arm 20 will be oscillated and it will allow its contact 19 to engage the fixed contact 16 for relatively short intervals. In other words, this is the low heat position of the device. In between the two extreme positions, the percentage of time that the blanket is energized to the percentage of time that it is not energized will depend upon how far the wedge 37 is from the stop 47; the farther away from this stop that the wedge is located the greater will be the percentage of time that the blanket is energized for each revolution of the cam 29.

Preferably, the adjusting knob 45 will be provided with a pointer 48 which will move against a fixed scale 49 graduated from the low heat position indicated "LO" to the high heat position indicated "HI." A depending stop plate 41a which is fixed to the arm 41 limits the arm from further movement at the "LO" and "HI" heat positions. For this purpose stop pins 41b and 41c are provided in the leg 7 of plate 5.

It will be observed that the spiral member 38 not only supports the wedge-shaped member 37 but it will also flex laterally with reference to the longitudinal line of adjustment of the wedge 37 so as to permit it to move up and down in the casing as the actuating arm 26 oscillates.

The spiral member 38 which supports the wedge also functions as a compensator for ambient temperature changes and for this purpose it is formed as a temperature responsive element. In the particular embodiment of the invention illustrated it is formed as a bimetallic element, which as is well understood by those skilled in the art, is an element formed of two metals having dissimilar temperature coefficients of expansion and which metals are rigidly secured together lengthwise in any suitable way as by welding. The high expansion metal is formed on the outside while the low expansion is located on the inside of the thermometal. Thus, as the ambient temperature increases the wedge moves toward the right as viewed in Fig. 3 to cut down the percentage of time that the blanket is energized, whereas when the ambient temperature decreases the wedge is moved toward the left as viewed in Fig. 3 to increase the time of energization—all so as to hold a substantially constant temperature in the blanket as set by the manual knob 45.

The function of the depression 36 in the cam 29, previously referred to, is to release the wedge 37 once for each revolution of the cam so that it is free to take a new position of longitudinal adjustment either because there has been a change in the setting of the knob 45 or a change in the ambient temperature. Thus, during each revolution of the cam 29 the pin 33 carried by the actuating arm 26 is permitted to fall into the depression 36, as shown in Fig. 3, to release the wedge 37 from the switch arm 20 and from the arm 26. At this position of the cam 29 the wedge 37 is free to move and hence the bimetal element 38 is free to shift it under either the two above-mentioned conditions, or both of them.

Because the wedge may be firmly engaging the switch arm 20 and the actuating arm 26 at the time the knob 45 is adjusted, a spring washer 49a is inserted between the pinion 43 and the base plate section 7 to maintain sufficient friction to overcome the returning movement of the thermal spiral 38.

As pointed out previously, the bottom wall 9 is provided with an enlarged opening 10 normally closed by a screen 11. This is for the purpose of permitting air freely to enter the casing at the bottom and flow out of the top through suitable openings 50 formed in the top of the casing. This subjects the ambient temperature compensating member 38 to the temperature of the air surrounding the control device.

Preferably also, the control device will comprise an "on" and "off" line switch 51 having an "off" station 52, and two spaced "on" station contacts 53 and 53a, and also a movable contact 53b. This switch is shown but diagrammatically in Fig. 6, and any suitable one may be used, but preferably one having "on" and "off" push buttons 54 and 55 wherein the "on" button has two "on" positions in one of which contact 53 is closed and in the other of which contact 53a is closed. This switch also preferably will be mounted within the casing 6 and the two buttons 54 and 55 will project upwardly through suitable openings provided for them in the top wall of the casing as shown in Figs. 1 and 2. The switch 51 controls not only the blanket energization and that of motor 31 but also that of a signal lamp 57 connected in the circuit across a resistance 58 and in series with a resistance 59, as shown in Fig. 6. When the switch contact 53b closes contact 53, the blanket is energized and controlled by the motor 31 independently of the lamp; but when the switch contact 53b closes contact 53a the lamp is energized whenever the blanket is energized, and thereby gives visual indication of the blanket's cycling. It is to be noted that when contact 53 is closed the motor 31 will be energized through the resistance 58. Under such conditions, the current flowing through resistance 58 will be so small that the lamp will not be energized. However, when contact 53a is closed the full blanket current will flow through the resistance 58, and the lamp will be energized.

Preferably and as shown, the lamp 57 will be mounted on a translucent housing 60, which preferably will be formed integrally with the knob 45, which also will be formed of the translucent material. Therefore, when the lamp is energized, the knob will glow and thereby give a visual indication that the lamp is energized, and the blanket "plugged in."

In the operation of the control device, it will be understood that when the "on" button is depressed to close the line circuit either by closing contact 53 or 53a, the motor 31 will be energized to drive the cam 29 continuously in order to oscillate the actuating arm 26. The motion of this arm will be transmitted to the switch actuating arm 20 to open and close the contacts 18 and 19 so as to control the energization of the blanket, the proportion of time that the blanket is energized to the time that it is deenergized depending both upon the setting of the manually adjustable knob 45 and upon the ambient temperature which influences the bimetal element 38, all in the manner previously described. Whether or not the lamp 57 is energized depends upon whether the contact 53 is closed or the contact 53a is closed. When it is desired to disconnect the blanket from the supply source the "off" button 55 is depressed which moves contact arm 53b to open the switch 51.

While we have shown and described a particular embodiment of our invention, it will be obvious to those skilled in the art that various changes and modifications may be made without departing from our invention in its broader aspects and we therefore aim in the appended claims to cover all such changes and modifications as fall within the true spirit and scope of our invention.

What we claim as new and desire to secure by Letters Patent of the United States is:

1. A circuit controller for controlling the energizing circuit of an electrically heated device comprising a circuit control device connected in said circuit, a pair of relatively movable diverging oscillatory arms for controlling the operation of said circuit controlling device to heat-increasing and heat-decreasing positions, a wedge inserted between said arms functioning as a motion transmitter from one of them to the other, means for periodically oscillating said one of said arms, the motion of said one arm that is transmitted by said wedge to the other arm depending upon the position of said wedge longitudinally of said arms, the resulting movements of said one arm controlling said circuit control device to determine the proportion of time it is in its heat-increasing and heat-decreasing positions respectively, and temperature responsive means controlling the position of said wedge longitudinally of said arms.

2. A circuit controller for controlling the energizing circuit of an electrically heated device comprising a circuit control device connected in said circuit, a pair of relatively movable diverging oscillatory arms for controlling the operation of said circuit controlling device to heat-increasing and heat-decreasing positions, a wedge inserted between said arms functioning as a motion transmitter from one of them to the other, means for periodically oscillating said one of said arms, the motion of said one arm that is transmitted by said wedge to the other arm depending upon the position of said wedge longitudinally of said arms, the resulting movements of said one arm controlling said circuit control device to determine the proportion of time it is in its heat-increasing and heat-decreasing positions respectively, and a temperature responsive element supporting said wedge between said arms to adjust it longitudinally with reference to them responsively to ambient temperature changes, said element constructed and arranged to permit movement of said wedge at right angles to its path of longitudinal adjustment to permit it to transmit motion from said one arm to said other arm.

3. A circuit controller for controlling the energizing circuit of an electrically heated device comprising a switch connected in said circuit, a switch actuating arm for operating said switch biased in one direction to a normal contact-closed position and movable in the opposite direction to open said switch, a second arm angularly related to said first arm so as to be spaced therefrom, means biasing said second arm away from said switch arm, a cam engaged by said second arm to control its position, means for rotating said cam, a wedge between said arms, a temperature responsive element normally supporting said wedge in spaced relation to both of said arms, and for adjusting it longitudinally along the lengths of said arms responsively to temperature variations, and further constructed and arranged to permit it to be moved laterally by said second arm to transmit the motion thereof to said switch arm, and said cam once each revolution withdrawing said second arm away from said wedge to permit it to assume its position spaced from both of said arms and thereby free it for movement by said temperature responsive element.

4. A circuit controller for controlling the energizing circuit of an electrically heated device comprising a switch having a pair of cooperating contacts in said circuit to control it, one contact being fixed, a first arm carrying the other contact, support means pivotally supporting said arm for oscillating motion, biasing means urging said arm to force its contact into engagement with said fixed contact, a second arm located on the contact side of said first arm substantially coextensive with the first arm and angularly related to it, means pivotally mounting said second arm for oscillating motion, means biasing said second arm away from said first arm, a cam engaging said second arm to limit its movement by said biasing means and to control its movement toward and away from said first arm, means for driving said cam at a constant speed, said cam each revolution thereof forcing said second arm toward said first arm in a direction to move said first arm away from said fixed contact, a wedge interposed between said arms and transmitting the motion of said second arm to said first arm, the motion of said first arm depending upon the position of said wedge longitudinally of the lengths of said arms, a bimetallic member carrying said wedge so as to support it between said arms, said bimetallic member being free to move to adjust the longitudinal position of said wedge responsive to the temperature of said member and also to be moved laterally to permit said wedge to be moved by said second arm, a support supporting said bimetallic member, and means for adjusting the position of said support to adjust the longitudinal position of said wedge.

5. A circuit controller for controlling the energizing circuit of an electrically heated device comprising a switch having a pair of cooperating contacts in said circuit to control it, one contact being fixed, a first arm carrying the other contact, support means pivotally supporting said arm for oscillating motion, biasing means urging said arm to force its contact into engagement with said fixed contact, a second arm located on the contact side of said first arm substantially coextensive with the first arm and angularly related to it, means pivotally mounting said second arm for oscillating motion, means biasing said second arm away from said first arm, a cam engaging said second arm to limit its movement by said biasing means and to control its movement toward and away from said first arm, means for driving said cam at a constant speed, said cam each revolution thereof forcing said second arm toward said first arm in a direction to move said first arm away from said fixed contact, a wedge interposed between said arms and transmitting the motion of said second arm to said first arm, the motion of said first arm depending upon the position of said wedge longitudinally of the lengths of said arms, a spiral bimetallic member carrying said wedge on its outer end so as to support it between said arms, said outer end being free to move to adjust the longitudinal position of said wedge responsive to the temperature of said member and also to be moved laterally to permit said wedge to be moved by said second arm, a support supporting the inner end of said spiral member, and means for adjusting said support to adjust the longitudinal position of said wedge.

6. A circuit controller for controlling the energizing circuit of an electrically heated device comprising a switch having a pair of cooperating contacts in said circuit to control it, one contact being fixed, a first arm carrying the other contact on one end thereof, support means pivotally supporting the other end of said arm, biasing means urging said arm to force its contact into engagement with said fixed contact, a second arm located on the contact side of said first arm substantially coextensive with the first arm and angularly related to it, means pivotally mounting the end of said second arm corresponding to the pivoted end of said first arm, means biasing said second arm away from said first arm, a cam engaging said second arm to limit its movement by said biasing means and to control its movement, means for driving said cam at a constant speed, said cam each revolution thereof forcing said second arm toward said first arm in a direction to move said first arm away from said fixed contact, a wedge interposed between said arms and transmitting the motion of said second arm to said first arm, the motion of said first arm depending upon the position of said wedge longitudinally of the lengths of said arms, a spiral bimetallic member carrying said wedge on its outer end so as to support it between said arms, said outer end being free to move to adjust the longitudinal position of said wedge responsive to the temperature of said member and also to be moved laterally to permit said wedge to be moved by said second arm, a support supporting the inner end of said spiral member, means for adjusting said support to adjust the longitudinal position of said wedge, and said cam once each revolution withdrawing said second arm from said wedge to release the wedge so that it may be moved to a position of adjustment as determined by the temperature of said element or the adjustment of said element support or both.

7. A circuit controller for controlling the energizing circuit of an electrically heated device comprising a circuit control device connected in said circuit, a pair of relatively movable diverging oscillatory arms for controlling the operation of said circuit controlling device to heat-increasing and heat-decreasing positions, a wedge inserted between said arms functioning as a motion transmitter from one of them to the other, operating means for periodically oscillating said one of said arms, the motion of said one arm that is transmitted by said wedge to the other arm depending upon the position of said wedge longitudinally of said arm, the resulting movements of said one arm controlling said circuit control device to determine the proportion of time it is in its heat-increasing and heat-decreasing positions respectively, a temperature responsive element supporting said wedge between said arms to adjust it longitudinally with reference to them responsively to ambient temperature changes, said element constructed and arranged to permit movement of said wedge at right angles to its path of longitudinal adjustment to permit it to transmit motion from said one arm to said other arm, and said operating means operating periodically to withdraw said one arm from said wedge to release the wedge so that it may be moved longitudinally to a position of adjustment by said temperature responsive element in response to changes in the temperature thereof.

JACOB W. McNAIRY.
FRANK A. ROSENKRANS.
ARTHUR E. COOMBS.